United States Patent [19]

Masegi et al.

[11] Patent Number: 5,135,254
[45] Date of Patent: Aug. 4, 1992

[54] VEHICLE AIR BAG APPARATUS

[75] Inventors: Mitsuhiko Masegi, Nukata; Akira Kondo, Okazaki; Masahito Mutoh, Toyota; Koichi Fujita, Nagoya, all of Japan

[73] Assignees: Nippondenso Co., Ltd., Kariya; Toyota Jidosha Kabushiki Kaisha, Toyota, both of Japan

[21] Appl. No.: 686,623

[22] Filed: Apr. 18, 1991

[30] Foreign Application Priority Data

Apr. 18, 1990 [JP] Japan .................. 2-102472

[51] Int. Cl.$^5$ ............................. B60R 21/16
[52] U.S. Cl. ......................................... 280/735
[58] Field of Search ......................... 280/734, 735

[56] References Cited

U.S. PATENT DOCUMENTS 4,220,871  9/1980  Yasui et al. .
5,045,835  9/1991  Masegi ............... 280/735 X
5,068,640  11/1991  Burger ............... 280/735 X

FOREIGN PATENT DOCUMENTS

2-18755  2/1990  Japan .
2-18756  2/1990  Japan .
8801241  2/1988  PCT Int'l Appl. .
9002674  3/1990  PCT Int'l Appl. .

Primary Examiner—Richard A. Schacher
Attorney, Agent, or Firm—Cushman, Darby & Cushman

[57] ABSTRACT

Air bags are located at different positions within a vehicle. Squibs serve to fire and activate the air bags respectively. An acceleration detecting device is provided in common to the squibs for detecting an acceleration of the vehicle upon a collision of the vehicle and executing a switching operation in response to the detected vehicle acceleration. Constant-current circuits supplied with an electric power from a vehicle battery feed constant electric currents for a firing operation to the squibs respectively in response to the switching operation of the acceleration detecting device. An energy storage device serves to feed a backup electric power to the constant-current circuits when the supply of the electric power from the vehicle battery is cut off. Each of the constant-current circuits includes a first transistor for feeding an electric current to the related squib, a first resistor for detecting a level of the electric current fed to the squib, a second transistor conducting an electric current with a level which depends on the electric current level detected by the first resistor, and a second resistor for generating a voltage which depends on the electric current conducted by the second transistor and for controlling the first transistor in response to the generated voltage.

12 Claims, 5 Drawing Sheets

VEHICLE AIR BAG APPARATUS

BACKGROUND OF THE INVENTION

1. Field of the Invention

This invention relates to a vehicle air bag apparatus including a plurality of air bags.

2. Description of the Prior Art

A known motor-vehicle air bag system includes air bags and squibs for activating the air bags respectively. The squibs are connected to an electric power supply via resistors respectively. An energy storage backup capacitor is connected in parallel to the electric power supply. The squibs are arranged in parallel to each other. When one of the squibs falls into a short-circuited state, the arrangement of the resistors connected to the squibs enable the other squib to receive a necessary drive current from the electric power supply and the backup capacitor. However, the resistors consume certain amounts of electric power, requiring a greater power supply ability of the electric power supply or the backup capacitor.

SUMMARY OF THE INVENTION

It is an object of this invention to provide an improved vehicle air bag apparatus.

A first aspect of this invention provides a vehicle air bag apparatus comprising first and second air bags located at different positions within a vehicle for protecting occupants of the vehicle; first and second squibs for firing and activating the first and second air bags respectively; acceleration detecting means provided in common to the first and second squibs for detecting an acceleration of the vehicle upon a collision of the vehicle and executing a switching operation in response to the detected vehicle acceleration; first and second constant-current circuits supplied with an electric power from a vehicle battery and feeding constant electric currents for a firing operation to the first and second squibs respectively in response to the switching operation of the acceleration detecting means; and energy storage means for feeding a backup electric power to the first and second constant-current circuits when the supply of the electric power from the vehicle battery to the first and second constant-current circuits is cut off; wherein each of the first and second constant-current circuits comprises a first transistor for feeding an electric current to the related squib, a first resistor for detecting a level of the electric current fed to the squib, a second transistor conducting an electric current with a level which depends on the electric current level detected by the first resistor, and a second resistor for generating a voltage which depends on the electric current conducted by the second transistor and for controlling the first transistor in response to the generated voltage to control the electric current fed to the squib.

A second aspect of this invention provides a vehicle air bag apparatus comprising first and second air bags located at different positions within a vehicle for protecting occupants of the vehicle; first and second squibs for firing and activating the first and second air bags respectively; acceleration detecting means for detecting an acceleration of the vehicle upon a collision of the vehicle and executing a switching operation in response to the detected vehicle acceleration; first and second constant-current circuits supplied with an electric power from a vehicle battery and feeding constant electric currents for a firing operation to the first and second squibs respectively in response to the switching operation of the acceleration detecting means; and energy storage means for feeding a backup electric power to the first and second constant-current circuits when the supply of the electric power from the vehicle battery to the first and second constant-current circuits is cut off; wherein each of the first and second constant-current circuits comprises a first transistor for feeding an electric current to the related squib, a first resistor for detecting a level of the electric current fed to the squib, a second transistor conducting an electric current with a level which depends on the electric current level detected by the first resistor, a second resistor for generating a voltage which depends on the electric current conducted by the second transistor and for controlling the first transistor in response to the generated voltage to control the electric current fed to the squib, and a third transistor connected in parallel with the second transistor for ensuring an operation of the second transistor.

A third aspect of this invention provides a vehicle air bag apparatus comprising first and second air bags; first and second squibs for activating the first and second air bags respectively; means for detecting a collision of a vehicle; means for supplying first and second electric currents to the first and second squibs respectively when the detecting means detects the collision of the vehicle; first regulating means for regulating the first electric current; and second regulating means for regulating the second electric current; wherein the first regulating means comprises varying means for varying the first electric current, sensing means for sensing a level of the first electric current, and first and second control means for controlling the varying means in response to the first electric current level sensed by the sensing means, the first and second control means backing up each other when one of the first and second control means fails.

A fourth aspect of this invention provides a vehicle air bag apparatus comprising first and second air bags; first and second squibs for activating the first and second air bags respectively; means for detecting a collision of a vehicle; means for supplying first and second electric currents to the first and second squibs respectively when the detecting means detects the collision of the vehicle; first regulating means for regulating the first electric current; and second regulating means for regulating the second electric current; wherein the first regulating means comprises first varying means for varying the first electric current, first sensing means for sensing a level of the first electric current, and first and second control means for controlling the first varying means in response to the first electric current level sensed by the first sensing means, and the first and second control means backing up each other when one of the first and second control means fails; wherein the second regulating means comprises second varying means for varying the second electric current, second sensing means for sensing a level of the second electric current, and third and fourth control means for controlling the second varying means in response to the second electric current level sensed by the second sensing means, the third and fourth control means backing up each other when one of the third and fourth control means fails.

DESCRIPTION OF THE FIRST PREFERRED EMBODIMENT

Figure 1:
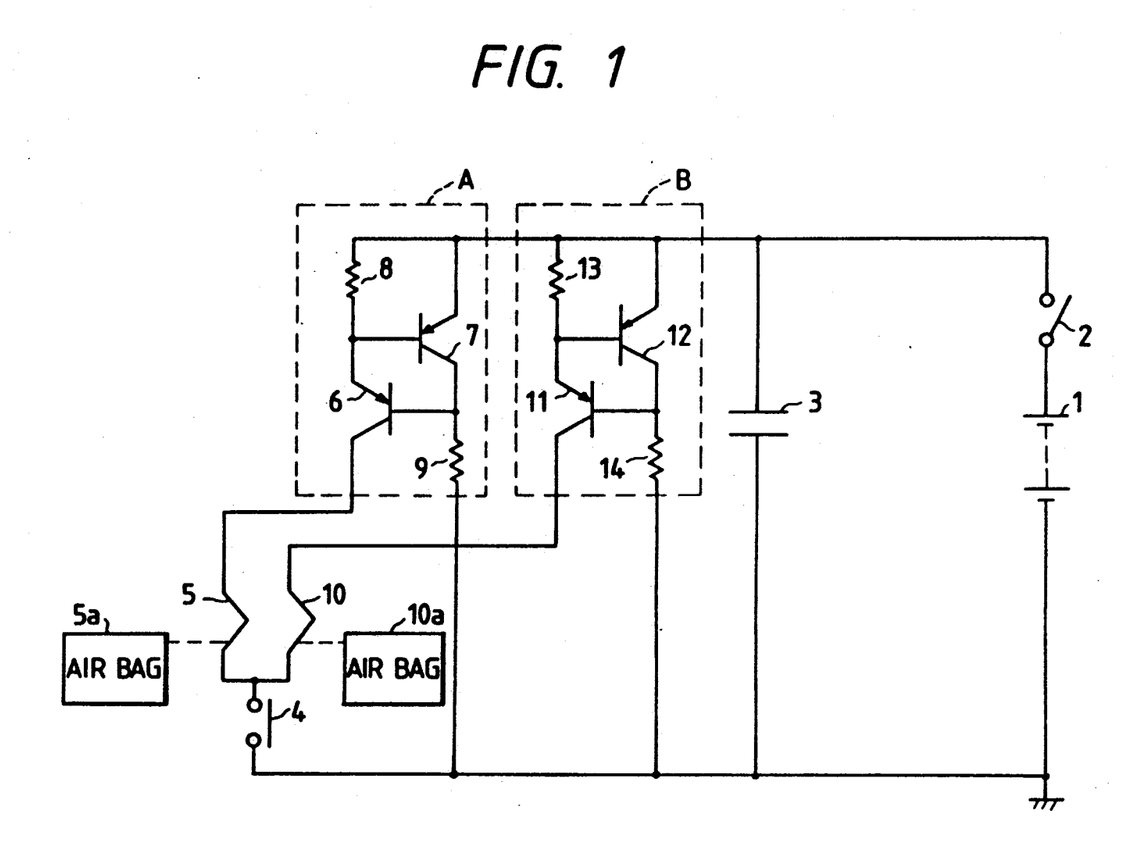
FIG. 1 is a diagram of a vehicle air bag apparatus according to a first embodiment of this invention.

With reference to FIG. 1, a control circuit of a vehicle air bag apparatus includes a vehicle battery 1, a vehicle engine ignition switch 2, a backup capacitor 3, squibs 5 and 10, and an acceleration (deceleration) detection switch 4. The backup capacitor 3 is connected in parallel with the battery 1 via the ignition switch 2. When the ignition switch 2 is closed, the backup capacitor 3 is charged by an electric current supplied from the battery 1. The squib 5 serves to activate an air bag 5a provided at the driver's seat in the vehicle. The squib 10 serves to activate an air bag 10a provided at the assistant driver's seat in the vehicle. The acceleration detection switch 4 includes an acceleration (deceleration) sensing section for sensing an acceleration (deceleration) of the vehicle, and a switching section responsive to the acceleration sensing section. When a collision of the vehicle occurs and a predetermined acceleration (deceleration) of the vehicle is detected by the acceleration sensing section of the acceleration detection switch 4, the acceleration detection switch 4 is closed. First ends of th squibs 5 and 10 are connected via the acceleration detection switch 4 to a first end of the backup capacitor and the negative terminal of the battery 1. Second ends of the squibs 5 and 10 are connected via respective constant-current circuits (current regulating circuits) A and B to a second end of the backup capacitor 3 which leads to the positive terminal of the battery 1 via the ignition switch 2. When the acceleration detection switch 4 is closed, electric currents generated by the battery 1 and the backup capacitor 3 flow through the squibs 5 and 10 so that the air bags 5a and 10 are activated respectively. The constant-current circuits A and B regulate the currents through the squibs 5 and 10 at predetermined levels respectively.

The constant-current circuit A includes a combination of transistors 6 and 7 and resistors 8 and 9. The resistor 8 serves to sense the current. The resistor 9 serves to apply a suitable bias potential to the transistor 6. The constant-current circuit B is similar to the constant-current circuit A, including a combination of transistors 11 and 12 and resistors 13 and 14.

The control circuit of FIG. 1 operates as follows. When the ignition switch 1 is closed, an electric current is supplied to the backup capacitor 3 from the battery 1 so that the backup capacitor 3 is charged. The backup capacitor 3 serves to feed necessary currents to the squibs 5 and 10 in cases where the battery 1 is damaged or the connection to the battery 1 is broken upon a collision of the vehicle.

When a collision of the vehicle occurs and the acceleration detection switch 4 is closed, electric currents generated by the battery 1 and the backup capacitor 4 flow through the squibs 5 and 10 and the constant-current circuits A and B. The currents flowing through the squibs 5 and 10 are regulated at predetermined levels by the constant-current circuits A and B. The current flowing through the squibs 5 and 10 fire associated explosives (not shown), inflating the air bags 5a and 10a respectively.

In this case, the constant-current circuit A operates as follows. The level of a current flowing through the current sensing resistor 8 is equal to the sum of the level of a current flowing through the squib 5 and the level of a base drive current to the transistor 6. The current-amplification factor of the transistor 6 is chosen so that the level of the current flowing through the current sensing resistor 8 will be approximately equal to the level of the current flowing through the squib 5. Thus, there occurs a voltage across the current sensing resistor 8 which is approximately proportional to the current flowing through the squib 5. When the voltage across the current sensing resistor 8 exceeds a predetermined level, that is, when the current flowing through the squib 5 exceeds a predetermined level, the transistor 7 is made conductive and the transistor 6 is reverse-biased by the resistor 9 so that the current flowing through the transistor 6 and the squib 5 will be decreased. When the voltage across the current sensing resistor 8 drops below the predetermined level, that is, when the current flowing through the squib 5 drops below the predetermined level, the transistor 7 is made non-conductive and the transistor 6 is less reverse-biased by the resistor 9 so that the current flowing through the transistor 6 and the squib 5 will be increased. As a result, the current flowing through the squib 5 is maintained approximately at the predetermined level. The operation of the constant-current circuit B is similar to the operation of the constant-current circuit A. As a result of the operation of the constant-current circuit B, the current flowing through the squib 10 is maintained approximately at a predetermined level.

The squibs 5 and 10 sometimes fall into short-circuited states upon the firing of the associated explosives. Even in the case where one of the squibs 5 and 10 falls into a short-circuited state, the constant-current circuit associated with the short-circuited squib limits the current through the short-circuited squib at the predetermined level and the other squib is supplied with a necessary current via the associated constant-current circuit so that the other squib reliably activates the associated air bag.

As described previously, in cases where the battery 1 is damaged or the connection to the battery 1 is broken upon a collison of the vehicle, the backup capacitor 3 supplies necessary currents to the squibs 5 and 10 to inflate the air bags 5a and 10a.

In cases where the voltages across the battery 1 and the backup capacitor 3 are low, the voltages across the current sensing resistors 8 and 13 are low and the transistors 7 and 12 remain non-conductive so that the transistors 6 and 11 continue to be conductive. In these cases, the squibs 5 and 10 are subjected to the voltage which equals the voltage across the battery 1 or the backup capacitor 3 minus a small voltage drop in the constant-current circuits A and B, so that the squibs 5 and 10 can receive currents adequate to activate the air bags 5a and 10a.

Figure 2:
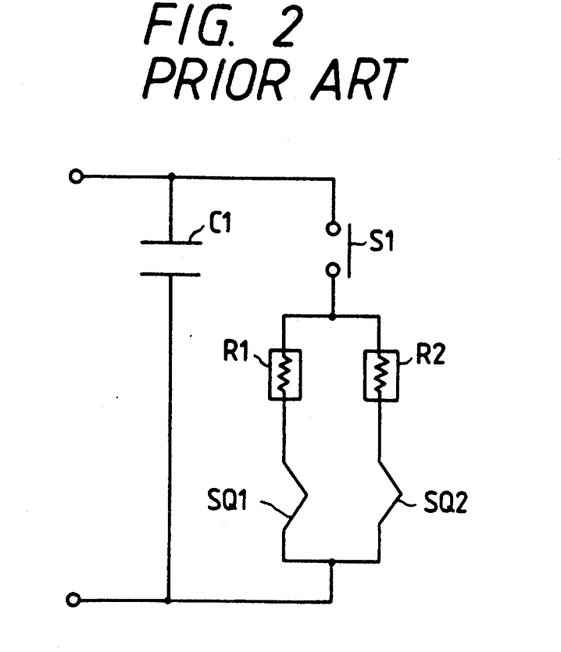
FIG. 2 is a schematic diagram of a part of a prior art vehicle air bag apparatus.

The advantage of the control circuit of FIG. 1 over a prior art control circuit will be explained hereinafter. FIG. 2 shows a prior art control circuit including a backup capacitor C1, an acceleration (deceleration)

detection switch S1, current controlling resistors R1 and R2, and squibs SQ1 and SQ2. The internal resistances of the squibs SQ1 and SQ2 are represented by RSQ1 and RSQ2 respectively. It is now assumed that the internal resistances RSQ1 and RSQ2 of the squibs SQ1 and SQ2 and the resistances of the resistors R1 and R2 are equal to 2 ohms, and that required currents flowing through the squibs SQ1 and SQ2 are equal to 1.5 A. In this case, the voltage across the backup capacitor C1 which is required upon the closing of the acceleration detection switch S1 is expressed as follows.

$$(RSQ1+R1) \times 1.5 = (2+2) \times 1.5 = 6(V)$$

where R1 represents the resistance of the resistor R1. When one of the squibs SQ1 and SQ2 is in a short-circuited state, the backup capacitor C1 is required to generate an electric current of the following level.

$$6/(2+2) + 6/(2+0) = 4.5(A)$$

In the prior art control circuit of FIG. 2, under the previously-mentioned conditions, the required voltage across the backup capacitor C1 is equal to 6 V, and the required current generated by the backup capacitor C1 is equal to 4.5 A when one of the squibs SQ1 and SQ2 is in the short-circuited state.

Figure 3:
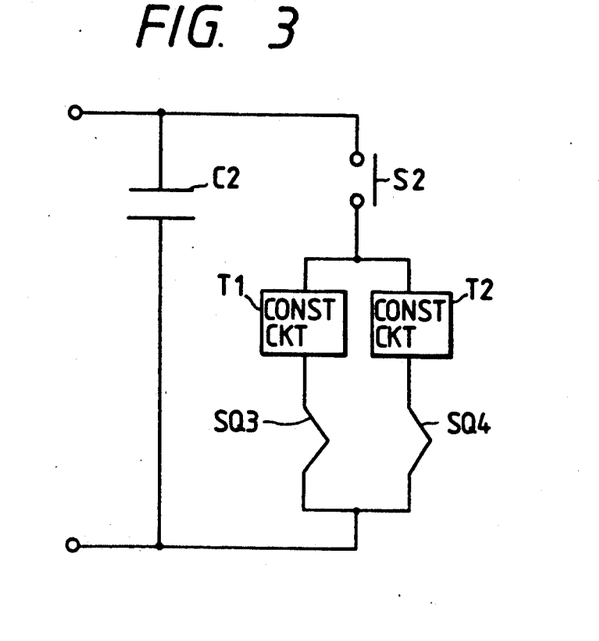
FIG. 3 is a schematic diagram of an equivalent circuit of a part of the vehicle air bag apparatus of FIG. 1.

FIG. 3 shows an equivalent circuit for the control circuit of FIG. 1. The control circuit of FIG. 3 includes a backup capacitor C2, an acceleration (deceleration) detection switch S2, constant-current circuits T1 and T2, and squibs SQ3 and SQ4. It is now assumed that the internal resistances of the squibs SQ3 and SQ4 are equal to 2 ohms and the saturation voltage of the constant-current circuits T1 and T2 is equal to 1 V, and that the level of the currents regulated by the constant-current circuits T1 and T2 is equal to 1.5 A. In this case, the voltage across the backup capacitor C1 which is required upon the closing of the acceleration detection switch S1 is expressed as follows.

$$2 \times 1.5 + 1 = 4(V)$$

When one of the squibs SQ3 and SQ4 is in a short-circuited state, the backup capacitor C2 is required to generate an electric current of the following level.

$$1.5 + 1.5 = 3(A)$$

In the control circuit of FIG. 3, under the previously-mentioned conditions, the required voltage across the backup capacitor C2 is equal to 4 V, and the required current generated by the backup capacitor C2 is equal to 3 A when one of the squibs SQ3 and SQ4 is in the short-circuited state. The required voltage across the backup capacitor C2 and the required current generated by the backup capacitor C2 in the control circuit of FIG. 3 are smaller than the corresponding voltage and current in the prior control circuit of FIG. 2. Thus, the capacitance of the backup capacitor C2 in the control circuit of FIG. 3 can be smaller than the capacitance of the backup capacitor C1 in the prior art control circuit of FIG. 2.

DESCRIPTION OF THE SECOND PREFERRED EMBODIMENT

Figure 4:
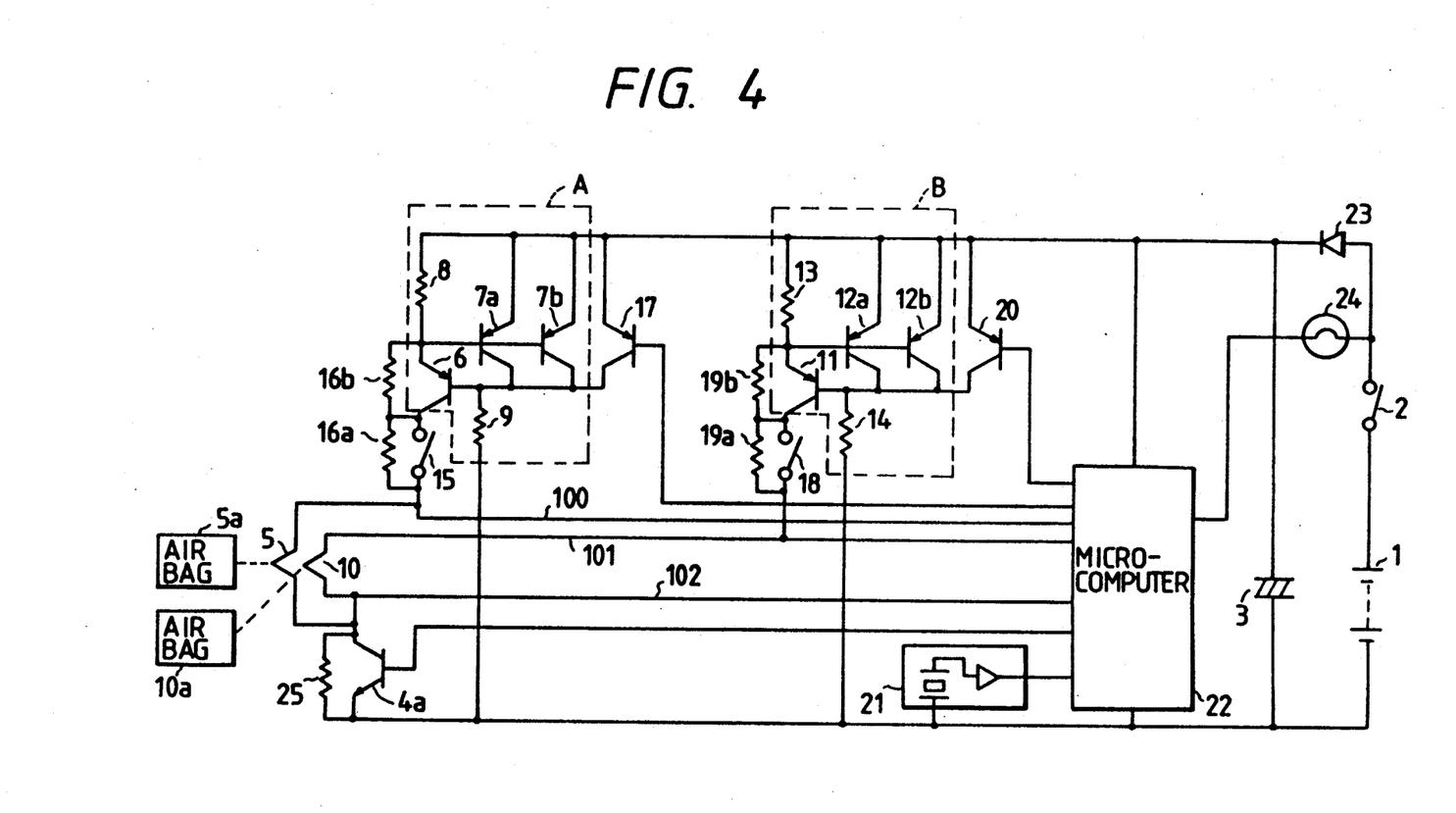
FIG. 4 is a diagram of a vehicle air bag apparatus according to a second embodiment of this invention.

With reference to FIG. 4, a vehicle air bag apparatus includes a transducer 21, a microcomputer 22, and a squib firing transistor 4a. The transducer 21 is of a semiconductor type, outputting an acceleration signal representing an acceleration (deceleration) of a vehicle. The microcomputer 22 detects a collision of the vehicle in response to the acceleration signal. When a collision of the vehicle is detected, the microcomputer 22 makes the firing transistor 4a conductive.

A squib 5 serves to activate an air bag 5a provided at the driver's seat in the vehicle. Another squib 10 serves to activate an air bag 10a provided at the assistant driver's seat in the vehicle. First ends of the squibs 5 and 10 are connected to a first end of a backup capacitor 3 and the negative terminal of a vehicle battery 1 via the emitter-collector path of the firing transistor 4a. Second ends of the squibs 5 and 10 are connected via deceleration responsive switches 15 and 18, and constant-current circuits A and B to a second end of the backup capacitor 3 which leads to the positive terminal of the battery 1 via a reverse-current blocking diode 23 and a vehicle engine ignition switch 2. The deceleration responsive switches 15 and 18 are of a known mechanical type, being closed in response to a deceleration of the vehicle which is smaller than a peak of a vehicle-collision deceleration. Transistors 17 and 20 connected to the constant-current circuits A and B serve as switches for selectively enabling and disabling the constant-current circuits A and B respectively. In other words, the transistors 17 and 20 serve to selectively allow and inhibit operations of the constant-current circuits A and B respectively.

The microcomputer 22 can be powered by an electric current from the battery 1 and the backup capacitor 3. The microcomputer 22 is connected to the ends of the squibs 5 and 10 via lines 100, 101, and 102. Specifically, the first ends of the squib 5 and 10 are connected in common to the microcomputer 22 via the line 102. The second ends of the squibs 5 and 10 are connected to the microcomputer 22 via the lines 100 and 101 respectively. When the ignition switch 2 is closed, the microcomputer 22 executes a primary check to decide whether or not the power supply lines to the squibs 5 and 10 are normal. During the primary check, the microcomputer 22 functions to enable small currents to flow through the squibs 5 and 10. For this purpose, the microcomputer 22 makes the firing transistor 4a and the switching transistors 17 and 20 conductive. When the switching transistors 17 and 20 are made conductive, transistors 6 and 11 within the constant-current circuits A and B fall constant-current circuits A and B is disabled. In this case, monitor resistors 16a, 16b, 19a, and 19b enable electric currents to flow from the battery 1 and the backup capacitor 3 through the squibs 5 and 10. The monitor resistors 16a, 16b, 19a, and 19b are designed so that the currents flowing through the squibs 5 and 10 will be limited to small levels at which the squibs 5 and 10 remain inactive. The monitor resistors 16a, 16b, 19a, and 19b are connected in parallel with the deceleration responsive switch 15, the transistor 6, the deceleration responsive switch 18, and the transistor 11 respectively. The small currents flowing through the squibs 5 and 10 cause predetermined voltages to appear at the ends of the squibs 5 and 10. The microcomputer 22 is informed of the voltages at the ends of the squibs 5 and 10 via the lines 100, 101, and 102. During the primary check, the microcomputer 22 executes the previously-mentioned decision by referring to the voltages at the ends of the squibs 5 and 10. In addition, during the primary check, the microcomputer 22 temporarily activates a lamp 24 on a vehicle instrument panel (not shown). The lamp 24 is connected between the battery 1 and the microcomputer 22. Also, when the microcomputer 22 detects that the power supply lines to the squibs 5 and 10 are wrong, the microcomputer 22 activates the lamp 24. Such a wrong condition of the power supply lines to the squibs 5 and 10 results from a line break, a short circuit, or other malfunctions.

The constant-current circuit A of FIG. 4 is similar to the constant-current circuit A of FIG. 1 except that a parallel combination of transistors 7a and 7b replace a single transistor 7. According to this design, the constant-current circuit A can maintain its normal operation even when one of the transistors 7a and 7b malfunctions, for example, when the emitter-collector path of one of the transistors 7a and 7b breaks. Thus, the transistors 7a and 7b back up each other in the case of a malfunction of one of them. In the constant-current circuit A of FIG. 1, it is difficult to check the transistor 7 until the transistor 7 is operated to feed a constant current, that is, it is difficult to check the transistor 7 through the primary check. In view of this fact, the constant-current circuit A of FIG. 4 adopts the arrangement of the parallel combination of the transistors 7a and 7b to realize the backup design to increase the reliability of the vehicle air bag apparatus. The constant-current circuit B is similar to the constant-current circuit A, and includes a parallel combination of transistors 12a and 12b. The microcomputer 22 can detect a malfunction of the transistors 6 and 11 within the constant-current circuits A and B by checking the voltages at the lines 100, 101, and 102.

Figure 5A:
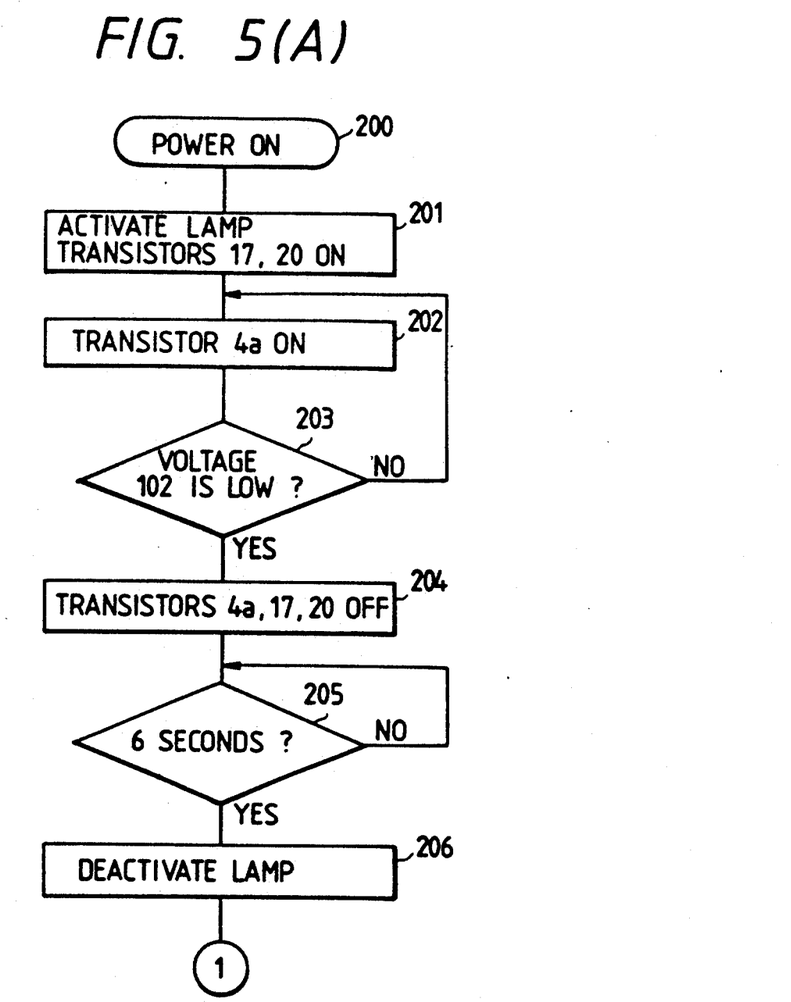
FIGS. 5(A) and 5(B) are a flowchart of a program controlling the microcomputer of FIG. 4.
Figure 5B:
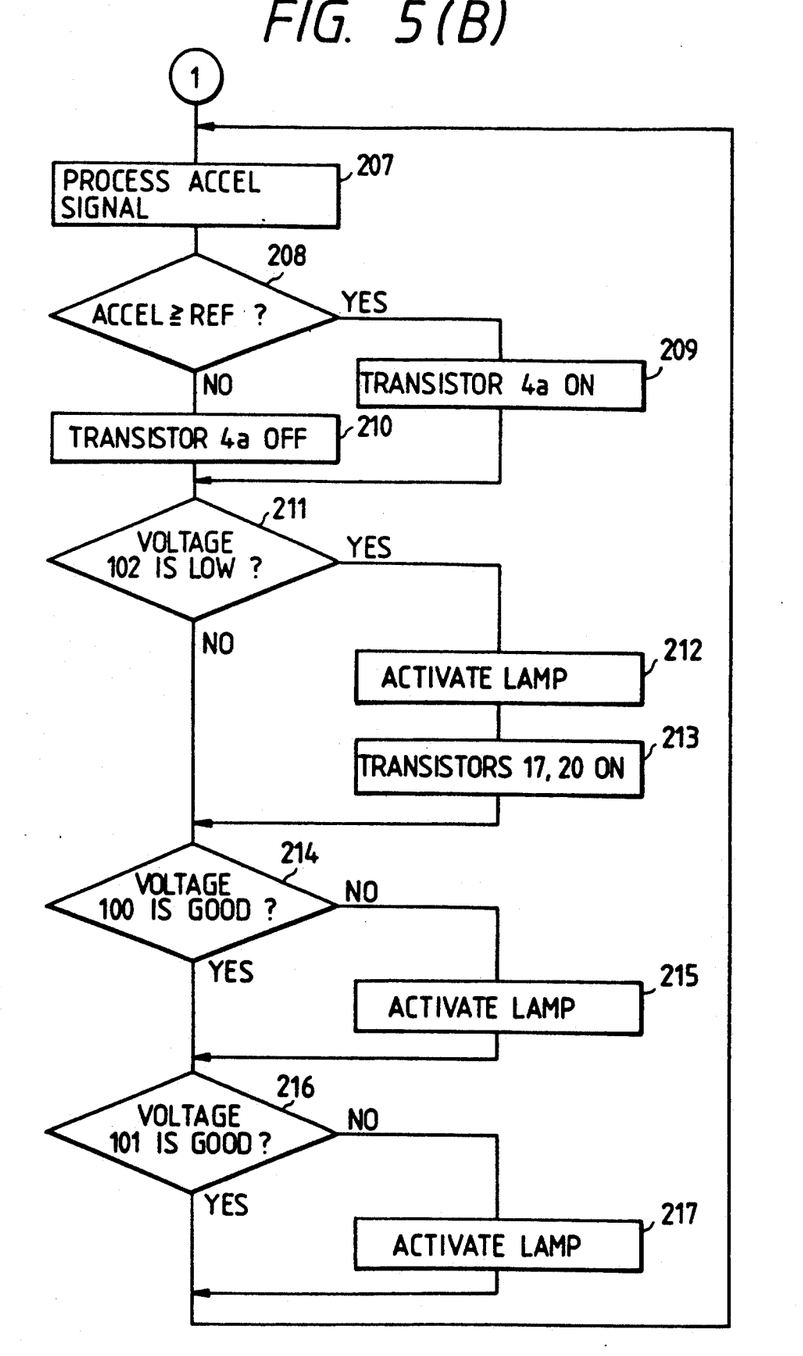

The microcomputer 22 includes a combination of an I/O port, a CPU, a ROM, and a RAM. The microcomputer 22 operates in accordance with a program stored in the ROM. FIGS. 5(A) and 5(B) are a flowchart of this program.

As shown in FIG. 5(A), when the ignition switch 2 is closed so that the microcomputer 22 is powered by the battery 1, the microcomputer 22 starts the program at a step 200 and then the program advances to a step 201. The step 201 activates the lamp 24 and makes the switching transistors 17 and 20 conductive. The activation of the lamp 24 informs the vehicle driver that a primary check is being executed. When the switching transistors 17 and 20 are made conductive, the associated constant-current circuits A and B are disabled as described previously. After the step 201, the program advances to a step 202 which makes the firing transistor 4a conductive. Under conditions where the power supply lines to the squibs 5 and 10 are normal, when the switching transistors 17 and 20 and the firing transistor 4a are made conductive, small currents flow through the squibs 5 and 10 as described previously. The voltage at the line 102 connected to the junction among the squibs 5 and 10 and the firing transistor 4a assumes a low level and a high level when the firing transistor 4a is normal and wrong respectively. A step 203 following the step 201 decides whether or the voltage at the line 102 is in a low level. When the voltage at the line 102 is decided to be in the low level, that is, when the firing transistor 4a is judged to be normal, the program advances from the step 203 to a step 204. When the voltage at the line 102 is decided to be not in the low level, that is, when the firing transistor 4a is judged to be wrong, the program returns from the step 203 to the step 202.

The step 204 makes the firing transistor 4a and the switching transistors 17 and 20 non-conductive. When the switching transistors 17 and 20 are made non-conductive, the associated constant-current circuits A and B are enabled as described previously. After the step 204, the program advances to a step 205. The step 205 decides whether or not a predetermined time, for example, 6 seconds, has elapsed from the moment of powering the microcomputer 22. When the step 205 decides that the predetermined time has not yet elapsed, the step 205 is reiterated. When the step 205 decides that the predetermined time has elapsed, the program advances from the step 205 to a step 206 which deactivates the lamp 24. The deactivation of the lamp 24 informs the vehicle driver that the primary check has been completed. As understood from the previous description, in the event of a malfunction of the firing transistor 4a, the steps 202 and 203 continue to be reiterated so that the step 206 remains unexecuted and thus the lamp 24 keeps activated. This continuous activation of the lamp 24 informs the vehicle driver of the malfunction of the firing transistor 4a.

After the step 206, the program advances to a step 207 of FIG. 5(B). The step 207 processes the acceleration signal from the transducer 21 to derive the acceleration (deceleration) of the vehicle. This signal process includes integrating the acceleration signal for the removal of noise. A step 208 following the step 207 decides whether or not the vehicle acceleration (deceleration) derived by the step 207 is smaller than a collision-detecting reference acceleration (deceleration). When the vehicle acceleration is decided to be smaller than the reference acceleration, that is, when a collision of the vehicle is judged to be absent, the program advances from the step 208 to a step 210 which keeps the firing transistor 4a non-conductive. When the vehicle acceleration is decided to be equal to or greater than the reference acceleration, that is, when a collision of the vehicle is judged to be present, the program advances from the step 208 to a step 209 which changes the firing transistor 4a to a conductive state. It should be noted that, during a collision of the vehicle, the acceleration responsive switches 15 and 18 are closed before the step 208 detects the collision of the vehicle. Therefore, the squibs 5 and 10 receive drive currents via the constant-current circuits A and B in response to the change of the firing transistor 4a to the conductive state so that the squibs 5 and 10 activate the air bags 5a and 10a respectively. The drive currents flowing through the squibs 5 and 10 are regulated at predetermined levels by the constant-current circuits A and B as described previously.

As will be made clear later, steps subsequent to the steps 209 and 210 serve to detect a break, a short-circuit, or other malfunctions of the power supply lines to the squibs 5 and 10 by referring to the voltages at the lines 100, 101, and 102. The voltage at the line 102 assumes a high level and a low level when a resistor 25 connected in parallel to the firing transistor 4a is normal and short-circuited to the ground respectively. A step 211 following the steps 209 and 210 decides whether or not the voltage at the line 102 is in a low level. When the voltage at the line 102 is decided to be not in the low level, that is, when the resistor 25 is judged to be normal, the program advances from the step 211 to a step 214. When the voltage at the line 102 is decided to be in the low level, that is, when the resistor 25 is judged to be short-circuited, the program advances from the step 211 to a step 212 which activates the lamp 24. The activation of the lamp 24 informs the vehicle driver of such a malfunction. A step 213 following the step 212 makes the switching transistors 17 and 20 conductive, so that the constant-current circuits A and B will be disabled and an erroneous activation of the squibs 5 and 10 can be prevented in the event of a short-circuit of the resistor 25. After the step 213, the program advances to the step 214. The voltage at the line 100 depends on whether or not the squib 5 is in a wrong condition such as an open state. The step 214 decides whether or not the voltage at the line 100 lies in a predetermined good range, in order to detect an open state of the squib 5. When the voltage at the line 100 is decided to be not in the good range, that is, when the squib 5 is decided to be normal, the program advances from the step 214 to a step 216. When the voltage at the line 100 is decided to be not in the good range, that is, when the squib 5 is decided to be wrong, the program advances from the step 214 to a step 215 which activates the lamp 24. The activation of the lamp 24 informs the vehicle driver of such a malfunction. After the step 215, the program advances to the step 216. The voltage at the line 101 depends on whether or not the squib 10 is in a wrong condition such as an open state. The step 216 decides whether or not the voltage at the line 101 lies in a predetermined good range, in order to detect an open state of the squib 10. When the voltage at the line 101 is decided to be in good range, that is, when the squib 10 is decided to be normal, the program returns from the step 216 to the step 207. When the voltage at the line 101 is decided to be not in the good range, that is, when the squib 10 is decided to be wrong, the program advances from the step 216 to a step 217 which activates the lamp 24. The activation of the lamp 24 informs the vehicle driver of such a malfunction. After the step 217, the program returns to the step 207.

This embodiment may be modified as follows. A first modification includes an additional combination of an air bag at the vehicle rear seat, a squib, and a constant-current circuit. A second modification uses a chargeable battery in place of the backup capacitor 3.

What is claimed is:

1. A vehicle air bag apparatus comprising:
   first and second air bags located at different positions within a vehicle for protecting occupants of the vehicle;
   first and second squibs for firing and activating the first and second air bags respectively;
   acceleration detecting means provided in common to the first and second squibs for detecting an acceleration of the vehicle upon a collision of the vehicle and executing a switching operation in response to the detected vehicle acceleration;
   first and second constant-current circuits supplied with an electric power from a vehicle battery and feeding constant electric currents for a firing operation to the first and second squibs respectively in response to the switching operation of the acceleration detecting means; and
   energy storage means for feeding a backup electric power to the first and second constant-current circuits when the supply of the electric power from the vehicle battery to the first and second constant-current circuits is cut off;
   wherein each of the first and second constant-current circuits comprises a first transistor for feeding an electric current to the related squib, a first resistor for detecting a level of the electric current fed to the squib, a second transistor conducting an electric current with a level which depends on the electric current level detected by the first resistor, and a second resistor for generating a voltage which depends on the electric current conducted by the second transistor and for controlling the first transistor in response to the generated voltage to control the electric current fed to the squib.

2. A vehicle air bag apparatus comprising:
   first and second air bags located at different positions within a vehicle for protecting occupants of the vehicle;
   first and second squibs for firing and activating the first and second air bags respectively;
   acceleration detecting means for detecting an acceleration of the vehicle upon a collision of the vehicle and executing a switiching operation in response to the detected vehicle acceleration;
   frist and second constant-current circuits supplied with an electric power from a vehicle battery and feeding constant electric currents for a firing operation to the first and second squibs respectively in response to the switching operation of the acceleration detecting means; and
   energy storage means for feeding a backup electric power to the first and second constant-current circuits when the supply of the electric power from the vehicle battery to the first and second constant-current circuits is cut off;
   wherein each of the first and second constant-current circuits comprises a first transistor for feeding an electric current to the related squib, a first resistor for detecting a level of the electric current fed to the squib, a second transistor conducting an electric current with a level which depends on the electric current level detected by the first resistor, a second resistor for generating a voltage which depends on the electric current conducted by the second transistor and for controlling the first transistor in response to the generated voltage to control the electric current fed to the squib, and a third transistor connected in parallel with the second transistor for ensuring an operation of the second transistor.

3. The vehicle air bag apparatus of claim 2 wherein the acceleration detecting means comprises a firing transistor provided in a power supply line to the first and second squibs, an acceleration sensor for detecting the acceleration of the vehicle and generating an acceleration signal representative thereof, and control means for detecting a collision of the vehicle in response to the acceleration signal from the acceleration sensor and activating the firing transistor upon a detection of the collision of the vehicle.

4. The vehicle air bag apparatus of claim 3 further comprising means for checking the power supply line to the first and second squibs to detect a malfunction of the power supply line to the first and second squibs.

5. The vehicle air bag apparatus of claim 4 further comprising means for inhibiting operations of the second and third transistor when the checking means detects the malfunction of the power supply line to the first and second squibs.

6. The vehicle air bag apparatus of claim 4 further comprising means for indicating the malfunction of the power supply line to the first and second squibs when the checking means detects the malfunction of the power supply line to the first and second squibs.

7. A vehicle air bag apparatus comprising:
first and second air bags;
first and second squibs for activating the first and second air bags respectively;
means for detecting a collision of a vehicle;
means for supplying first and second electric currents to the first and second squibs respectively when the detecting means detects the collision of the vehicle;
first regulating means for regulating the first electric current; and
second regulating means for regulating the second electric current;
wherein the first regulating means comprises varying means for varying the first electric current, sensing means for sensing a level of the first electric current, and first and second control means for controlling the varying means in response to the first electric current level sensed by the sensing means, the first and second control means backing up each other when one of the first and second control means fails.

8. A vehicle air bag apparatus comprising:
first and second air bags;
first and second squibs for activating the first and second air bags respectively;
means for detecting a collision of a vehicle;
means for supplying first and second electric currents to the first and second squibs respectively when the detecting means detects the collision of the vehicle;
first regulating means for regulating the first electric current; and
second regulating means for regulating the second electric current;
wherein the first regulating means comprises first varying means for varying the first electric current, first sensing means for sensing a level of the first electric current, and first and second control means for controlling the first varying means in response to the first electric current level sensed by the first sensing means, and the first and second control means backing up each other when one of the first and second control means fails;
wherein the second regulating means comprises second varying means for varying the second electric current, second sensing means for sensing a level of the second electric current, and third and fourth control means for controlling the second varying means in response to the second electric current level sensed by the second sensing means, the third and fourth control means backing up each other when one of the third and fourth control means fails.

9. The vehicle air bag apparatus of claim 8 wherein the collision-detecting means comprises acceleration detecting means for detecting an acceleration of the vehicle upon a collision of the vehicle and executing a switching operation in response to the detected vehicle acceleration, and wherein the acceleration detecting means comprises a firing transistor provided in a power supply line to the first and second squibs, an acceleration sensor for detecting the acceleration of the vehicle and generating an acceleration signal representative thereof, and control means for detecting a collision of the vehicle in response to the acceleration signal from the acceleration sensor and activating the firing transistor upon a detection of the collision of the vehicle.

10. The vehicle air bag apparatus of claim 9 further comprising means for checking the power supply line to the first and second squibs to detect a malfunction of the power supply line to the first and second squibs.

11. The vehicle air bag apparatus of claim 10 further comprising means for inhibiting operations of the first, second, third, and fourth control means when the checking means detects the malfunction of the power supply line to the first and second squibs.

12. The vehicle air bag apparatus of claim 10 further comprising means for indicating the malfunction of the power supply line to the first and second squibs when the checking means detects the malfunction of the power supply line to the first and second squibs.

* * * * *